(12) United States Patent
Hiratsuka et al.

(10) Patent No.: US 6,741,533 B1
(45) Date of Patent: May 25, 2004

(54) TRACKING ERROR DETECTION DEVICE

(75) Inventors: Takashige Hiratsuka, Ehime (JP); Shoji Marukawa, Ehime (JP); Toshinori Okamoto, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 312 days.

(21) Appl. No.: 09/830,676

(22) PCT Filed: Aug. 29, 2000

(86) PCT No.: PCT/JP00/05805

§ 371 (c)(1), (2), (4) Date: Aug. 6, 2001

(87) PCT Pub. No.: WO01/16948

PCT Pub. Date: Mar. 8, 2001

(30) Foreign Application Priority Data

Aug. 30, 1999 (JP) .......................................... 11-243618

(51) Int. Cl.[7] ................................................. G11B 7/00
(52) U.S. Cl. ................................ 369/44.41; 369/44.28; 369/44.29
(58) Field of Search ......................... 369/44.28, 44.29, 369/44.35, 44.34, 44.32, 44.41

(56) References Cited

U.S. PATENT DOCUMENTS

| | | | | |
|---|---|---|---|---|
| 4,785,441 A | * | 11/1988 | Tanaka et al. ............ | 369/44.41 |
| 4,933,922 A | | 6/1990 | Yokogawa | |
| 5,258,968 A | * | 11/1993 | Matsuda et al. .......... | 369/53.28 |
| 5,986,999 A | * | 11/1999 | Takahashi ................. | 369/44.41 |
| 6,236,628 B1 | * | 5/2001 | Kim ........................... | 369/44.41 |
| 6,266,305 B1 | * | 7/2001 | Buchler .................... | 369/44.32 |
| 6,285,635 B1 | * | 9/2001 | Watanabe et al. ........ | 369/44.27 |

FOREIGN PATENT DOCUMENTS

| | | | |
|---|---|---|---|
| JP | 63-46631 | | 2/1988 |
| JP | 4-183010 | | 11/1990 |
| JP | 9-161285 | | 12/1995 |
| JP | 10-97724 | | 7/1997 |
| JP | 10162381 A | * | 6/1998 |

\* cited by examiner

*Primary Examiner*—Thang V. Tran
(74) *Attorney, Agent, or Firm*—Wenderoth, Lind & Ponack, L.L.P.

(57) ABSTRACT

A tracking error detecting apparatus converts photoelectric current obtained by a photo detector into voltage signals at current/voltage conversion circuits, and adds the voltage signals to generate two signal series at adders. The two signal series are digitalized at analog to digital converters, are subjected to interpolation processing at interpolation filters and have their zero cross points detected by zero cross point detector circuits respectively. A phase difference between the zero cross points of the two signal series is detected by a phase difference detector circuit, and the phase difference is subjected to band restriction by a low pass filter, thereby to obtain a tracking error signal. The tracking error detecting apparatus is capable of coping with speed doubling of an optical recording/reproducing apparatus and density enhancing of an optical recording medium with a small size and at low cost.

20 Claims, 14 Drawing Sheets

Fig.5(a)
Fig.5(b)
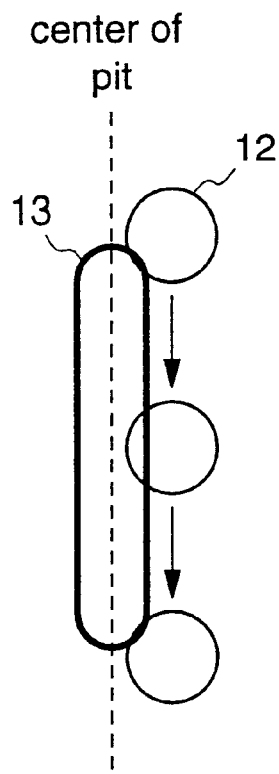
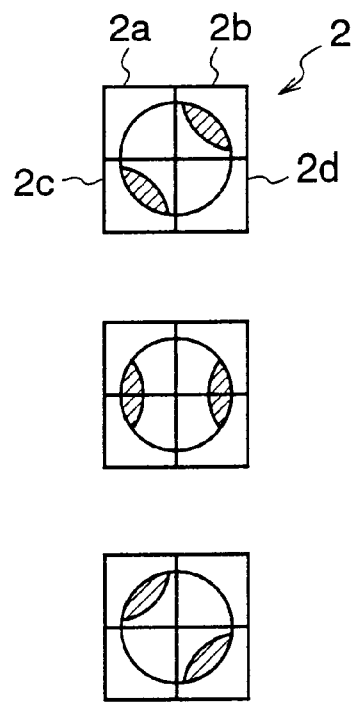
Fig.5(c)
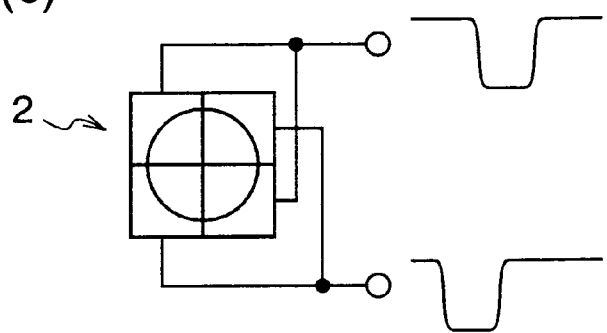

deviation of optical spot — deviating left ← center (no deviation) → deviating right 2a 2b
2c 2d 2a 2b
2c 2d 2a 2b
2c 2d 2a 2b
2c 2d

A
B

TRACKING ERROR DETECTION DEVICE

TECHNICAL FIELD

The present invention relates to a tracking error detecting apparatus which detects a tracking error of an optical spot that is obtained by radiating light on an optical recording medium.

BACKGROUND ART

As a method of obtaining a tracking control signal from an optical disk typified by a CD or a DVD in which information is recorded in the form of concavo-convex pits, a phase difference method has been employed in recent years.

As disclosed in Japanese Published Patent Application No. Hei.10-162381, the phase difference method is one which obtains a tracking error signal utilizing that when an optical spot deviates from the center of an information pit while the optical spot radiated on an information recording surface of an optical disk passes traversing on the information pit, a mapped image of the information pit on a photo detector (diffraction pattern) varies. That is, when the photo detector is divided in a track length direction for the information pit mapped image to see an output signal level according to respective accepted light quantities, the way of variation differs according to the direction and amount of the deviation of the optical spot from the center of the information pit. Therefore, by seeing the phase difference of the binarized signal which is obtained by binarizing the output of the photo detector with a prescribed level, a tracking error signal indicating the direction and amount of the deviation of the optical spot can be obtained.

A conventional method for detecting a tracking error will be described with reference to FIGS. 4 to 14.

FIG. 4 is a schematic diagram illustrating a main configuration of an optical pickup part 100 in FIG. 4, an astigmatic method is employed for a detection of a focus error signal.

A luminous flux radiated from a light source 1, such as a semiconductor laser is converted into a parallel beam at a collimator lens 3, goes through a half mirror 6, is converged by an objective lens 4, and is radiated on an information recording surface 51 on an optical recording medium (such as an optical disk) 5 as a small optical spot. A reflected light of the optical spot goes through the objective lens 4, has its optical path inflected in the right hand direction of the figure by the half mirror 6, and reaches a photo detector 2 through a convex lens 61 and a cylindrical lens 62 to be a convergent light having two focuses characteristic in the astigmatic method. Information on the optical recording medium 5 is recorded by an information pit line having unevenness.

Next, a description will be given of a method of obtaining a tracking error signal which indicates a positional deviation of the optical spot in a vertical direction against the pit line (track) in the information recording surface, by utilizing a diffraction pattern of light generated when the optical spot passes traversing on the pit.

An intensity distribution pattern (far field pattern) of the reflected light quantity of the optical spot changes according to the position of an information pit on which the optical spot passes traversing, FIGS. 5(a)–(c), 6(a)–(c), and 7(a)–(c) are diagrams exemplifying changes of the far field pattern of the reflected light quantity when the optical spot passes traversing on the pit. (a) of each figure is a diagram illustrating the physical relationship between an optical spot 12 and an information pit 13 (the center of the information pit 13 is described by a dotted line), and the optical spot 12 proceeds on the information pit 13 in a direction of arrows. (b) of each figure shows the transition of the intensity distribution pattern (far field pattern) of the reflected light quantity on the photo detector 2, and the three patterns shown in (b) of each figure respectively represent patterns when the optical spot 12 is at three positions shown in (a). (c) of each figure shows two signals obtained from the photo detector 2. Further, the photo detector 2 has photo acceptance units 2a–2d, respective twos being arranged vertically and horizontally, and the two signals obtained in (c) of each figure are ones which are obtained as a result of adding signals, that are obtained from the four photo acceptance units 2a–2d, for the photo acceptance units in a diagonal direction, respectively (i.e., 2a+2d and 2b+2c).

For example, as shown in FIG. 5(a), when the optical spot 12 passes traversing on the left of the center of the information pit 13 in the direction of movement, the pattern changes to rotate clockwise as shown in FIG. 5(b), resulting in two signals out of phase as in FIG. 5(c).

As shown in FIG. 6(a), when the optical spot 12 passes traversing on the center of the information pit 13, that is, the center of a track, the pattern changes symmetrically as in FIG. 6(b), resulting in two signals in phase as in FIG. 6(c).

As shown in FIG. 7(a), when the optical spot 12 passes traversing on the right of the center of the information pit 13 in the direction of movement, the pattern changes in a counterclockwise direction as shown in FIG. 7(b), resulting in two signals out of phase as in FIG. 7(c).

As described above, it is proved that the transition of the field pattern changes when the optical spot deviates from the center of the information pit. The phase difference method is the one that utilizes the changes of the far filed pattern so as to detect a tracking error signal. That is, the method comprises comparing phases of two adding signals obtained from the photo detector 2, and detecting the degree of phase advancement or delay, thereby recognizing a positional deviation between the optical spot 12 and the information pit 13.

A conventional tracking error detecting apparatus will be described with reference to FIGS. 8 and 9(a)–(h). FIG. 8 is a block diagram illustrating an example of a tracking error detecting apparatus which detects a phase difference to detect a tracking error signal, and FIGS. 9(a)–(h) diagrams of illustrating waveforms of signals denoted by (a)–(h) in FIG. 8. Further, FIGS. 9(a)–(h) diagrams of waveforms in a case where according to a passage of time, the optical spot 12 passes traversing on the information pit 13, crossing from the left side to the right side in the direction of movement, that is, changing from the state in FIGS. 5(a)–(c) to that in FIGS. 7(a)–(c).

The photo detector 2 has the photo acceptance units 2a, 2b, 2c, and 2d, respective twos being arranged vertically and horizontally, and detects optical signals to project into respective units as a photoelectric current. The detected photoelectric current is converted into voltage signals by current/voltage conversion circuits 7a, 7b, 7c, and 7d, respectively.

Next, adder 8a and 8b adds signals which are obtained from two pairs of units in a diagonal direction of the photo detector 2, for respective pairs. That is, an adder 8a adds outputs of the current/voltage conversion circuits 7a and 7c, and an adder 8b adds outputs of the current/voltage conversion circuit 7b and 7d. Two adding signals (a) and (b) become waveforms shown in FIGS. 9(a) and 9(b), respectively.

The adding signals (a) and (b) pass through binary circuits 9a and 9b so that binary signals (c) and (d) are obtained, respectively.

A phase difference detector circuit 10 detects a phase difference of rise or fall of the binary signals (c) and (d). In the circuit configuration shown in FIG. 8, a phase difference of fall is detected employing D-type flip flops (D-FF) 101a and 101b. The D-FFs 101 a and 101b have input terminals D, clock input terminals T, reset input terminals R, and output terminals Q and Q-, and when an input of the reset input terminal R is at logic level, an output of the output terminal Q is unconditionally at level, and when an input of the reset input terminal R is at logic level, a signal the logic level of which is the same as that applied to the input terminal D is outputted from the terminal Q at the fall of the clock input terminal T, "H"→"L". That is, the D-FFs 101a and 101b detect phase differences of the binary signals (c) and (d) to obtain time difference pulses (e) and (f), respectively. The time difference pulse (e) is outputted from the output terminal Q of the D-FF 101a, and the time difference The time difference pulses (e) and (f) are converted into a pulse-width modulation signal (g) at a difference detector 102, which further passes through a low-pass filter 11 to be an analog tracking error signal (h).

FIG. 10 illustrates a waveform of the tracking error signal (h) obtained when the tracking error signal is observed for plural tracks. When paying notice to a neighborhood of a specific track, the tracking error signal (h) obtained by the tracking error detecting apparatus shown in FIG. 8 is a nearly linear signal which is at a zero level when the optical spot is on the center of the track, and which, when the optical spot deviates right and left therefrom, has polarities according to the direction of the deviation. When observing the tracking error signal for plural tracks, the above-described linear signal waveform appears for each track, and when the optical spot is between tracks, a zero level is obtained, whereby as a whole, a serrate waveform repeated for each track is obtained as shown in FIG. 10.

In order to perform a tracking servo control employing the tracking error signal which appears as a serrate waveform repeatedly for each track with the polarity as in FIG. 10, a tracking servo control system is constructed so as to drive the objective lens 4 by a means generally referred to as a tracking actuator according to the positive and negative of the tracking error signal.

Further, since the conventional phase difference method detects the tracking error signal from respective pits on which the optical spot passes traversing, it is likely to be affected by the shape or depth of the pit, whereby an offset is generated in the tracking error signal when the objective lens 4 is FIGS. 11(a)–(c) and 12(a)–(c) are diagrams illustrating principles of offset generation when detecting the tracking error signal by the phase difference method, and FIGS. 11(a)–(c) shows a case where the depth of the information pit 13 is λ/4 (λ: wavelength of light source), while FIGS. 12(a)–(c) shows a case where the depth of the information pit is other than λ/4. In the figures, (a) Figure (a) illustrates an intensity distribution pattern (far field pattern) of the reflected light quantity on the photo detector 2 when the objective lens 4 does not move, Figure (b) illustrates an intensity distribution pattern (far field pattern) of the reflected light quantity on the photo detector 2 when the objective lens 4 moves, and Figure (c) illustrates a tracking error signal obtained. Further, Figures (a) and (b) illustrate cases where the optical spot 12 passes traversing on the center of the track and is located at the end of the information pit 13.

As shown in FIG. 11(a), in a case where the depth of the information pit 13 is λ/4 and the objective lens 4 does not move, patterns which appear in a first area (2a+2d) into which the photo acceptance units in a diagonal direction of the photo detector 2, 2a and 2d, are combined and in a second area (2b+2c) into which the other photo acceptance units in a diagonal direction, 2b and 2c, are combined are the same. In addition, as shown in FIG. 11(b), even when the objective lens 4 moves and the optical spot 12 on the photo detector 2 moves, the phase difference between signals outputted from the first area (2a+2d) and the second area (2b+2c), respectively is zero, as long as the optical spot 12 is on the center of the track. Therefore, as shown in FIG. 11(c), tracking error signals, the waveform patterns of which at the parts indicated by arrows A and B are the same, can be obtained.

Meanwhile, as shown in FIGS. 12(a)–(c), in a case where the depth of the information pit 13 is other than λ/4, a phase difference between signals outputted from the first area (2a+2d) and the second area (2b+2c) may be generated. As shown in FIG. 12(a), when a reflected light of the photo detector 2 does not move, there is no phase difference between the first area (2a+2d) and the second area (2b+2c), resulting in a tracking error signal of zero, but on the other hand, when the objective lens 4 moves as shown in FIG. 12(b), there is generated an unbalance and thus, the phase difference between the first area (2a+2d) and the second area (2b+2c), resulting in a generation of an offset in a tracking error signal. Therefore, tracking error signals, the waveform patterns of which at the parts indicated by arrows A and B in FIG. 12(c) are different, are obtained. When an offset is generated, it is impossible to perform tracking toward the center of the track, thereby deteriorating the quality of a reproduced waveform.

To solve the above-mentioned problems, a tracking error detecting apparatus as shown in FIG. 13 is proposed. In FIG. 13, the same configurations as those shown in FIG. 8 are denoted by the same reference numerals.

The above-described tracking error detecting apparatus adjusts the phases of the signals outputted from the photo detector 2 by employing delay circuits 14a and 14b, and thus, the offset of a phase difference tracking error signal can be canceled, thereby performing tracking toward the center of the track.

However, in case of the tracking error detection by the conventional method, the tracking error signal is detected by an analog signal processing, whereby it is not suited for doubling the speed of an optical recording/reproducing apparatus and for enhancing a density of an optical recording medium.

Here, problems due to doubling of speed and enhancing of density will be described.

While the tracking error detecting apparatus by an analog signal processing shown in FIG. 13 constructs an all pass filter with the delay circuits 14a and 14b for canceling an offset, and obtains the delay amount by group delay of the filter, in a case where the optical recording/reproducing apparatus doubles its speed, a channel route of read data of the optical recording/reproducing apparatus is different, whereby the required amount of delay changes considerably, and thus, the optimization of the delay circuits is required.

Further, when the recording density of the optical recording medium is high, the high frequency component of a read signal obtained from the photo detector 2 is attenuated, whereby it is impossible to detect a phase difference signal correctly.

As a means to solve this, a tracking error detecting apparatus a as shown in FIG. 14 is proposed. In FIG. 14, the same configurations as those shown in FIG. 8 are denoted by the same reference numerals, and their detailed descriptions will be omitted.

The tracking error detecting apparatus shown in FIG. 14 performs a high frequency emphasis toward two sum signals of the photo detector 2, (2a+2d and 2b+2c), which are obtained by the adders 8a and 8b, by waveform equalization filters 15a and 15b, and binarizes them by the binary circuits 9a and 9b subsequently, so as to obtain a phase difference signal, whereby attenuation of the high frequency component due to high density can be compensated.

However, since the waveform equalization filters 15a and 15b are composed of analog FIR filters, an all pass filter is required to compose a delay part of the FIR filter, whereby a problem described in the above-mentioned speed doubling occurs. In addition, when the recording density is different, the characteristics of high frequency emphasis required are different, whereby it is impossible to cope by the above-described tracking error detecting apparatus when further density enhancing is performed.

As described above, it is difficult to cope with speed doubling in an optical recording/reproducing apparatus and density enhancing of an optical recording medium by the conventional tracking error detecting apparatus which performs the tracking error detection by an analog processing. Further, since the conventional tracking error detecting apparatus has a large number of configurations involving the analog processing, it is difficult to unite the tracking error detecting apparatus with peripheral digital signal processing parts.

The present invention is made to solve the above-mentioned problems and has for its object to provide a tracking error detecting apparatus which can cope with speed doubling of an optical recording/reproducing apparatus and density enhancing of an optical recording medium in a small size and at low cost.

SUMMARY OF THE INVENTION

A tracking error detecting apparatus according to the present invention comprises: a photo detector for receiving reflected light of the optical spot and outputting photoelectric current according to the photo acceptance quantity; current/voltage conversion circuits for converting the photoelectric current of the photo detector into voltage signals; signal generators for generating two signal series, the phases of which change each other according to a tracking error of the optical spot, from the voltage signals; analog-digital converters for discretizing the two signal series to obtain first and second digital signal series; interpolation filters for performing interpolation processing toward the first and second digital signal series respectively; zero cross point detector circuits for respectively detecting zero cross points of the first and second digital signal series interpolated by the interpolation filters; a phase difference detector circuit for detecting a phase difference between the zero cross point of the first digital signal series and the zero cross point of the second digital signal series; and a low-pass filter for performing band restriction toward the detected phase difference to obtain a tracking error signal.

With the tracking error detecting apparatus of this configuration, a tracking error can be detected by digital signal processing, whereby it is easy to unite the signal processing after the ADC with peripheral digital signal processing parts. Further, required analog signal processing blocks can be reduced considerably. In addition, it is possible to cope with speed doubling in an optical recording/reproducing apparatus and density enhancing of an optical recording medium, whereby an optical recording/reproducing apparatus can be provided in a small size and at low cost.

Further, another conformation of the tracking error detecting apparatus according to the present invention comprises: a photo detector for receiving reflected light of the optical spot and outputting photoelectric current according to the photo acceptance quantity; current/voltage conversion circuits for converting the photoelectric current of the photo detector into voltage signals; analog-digital converters for discretizing the voltage signals to convert into digital signals; interpolation filters for performing interpolation processing toward the digital signals; signal generators for generating first and second digital signal series, the phases of which change each other according to a tracking error of the optical spot, from the signals obtained at the interpolation filter; zero cross point detector circuits for detecting zero cross points of the first and second digital signal series respectively; a phase difference detector circuit for comparing phases of the zero cross point of the first digital signal series and the zero cross point of the second digital signal series, so as to detect a phase difference; a low-pass filter for performing band restriction toward the detected phase difference; an offset detector circuit for detecting an offset in a tracking error signal from the output signal of the low-pass filter; and a factor setting circuit for setting a factor of the interpolation filter according to the detected offset.

With the tracking error detecting apparatus of this configuration, a tracking error can be detected by digital signal processing, whereby it is easy to unite the signal processing after the ADC with peripheral digital signal processing parts. Further, required analog signal processing blocks can be reduced considerably. In addition, it is possible to cope with speed doubling in an optical recording/reproducing apparatus and density enhancing of an optical recording medium, whereby an optical recording/reproducing apparatus can be provided in a small size and at low cost.

BRIEF DESCRIPTION OF DRAWINGS

FIGS. 5(a)–(c) are diagrams exemplifying changes of an intensity distribution pattern of the reflected light quantity when an optical spot passes traversing on a pit.

DETAILED DESCRIPTION OF THE INVENTION

Embodiment

Figure 1:
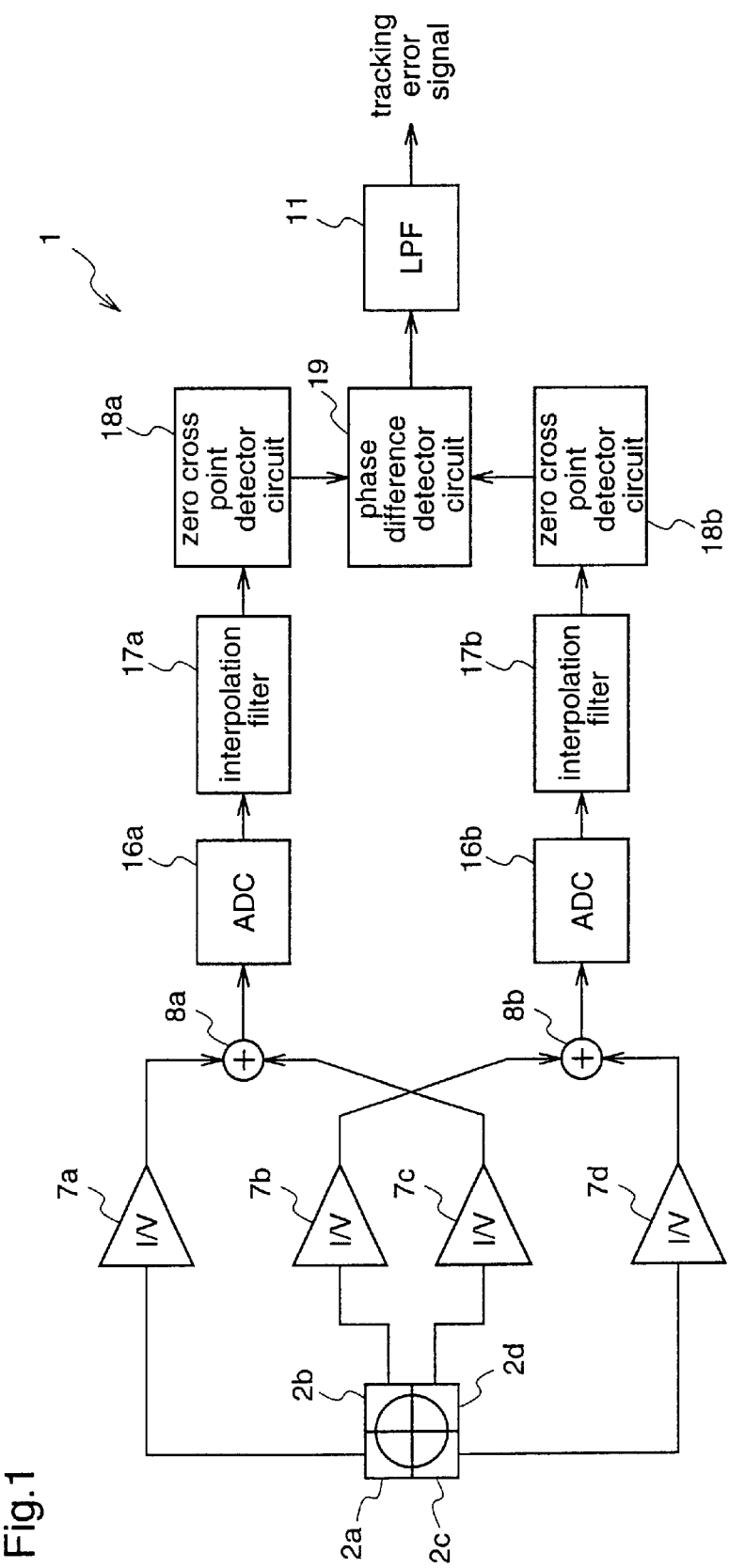
FIG. 1 is a block diagram illustrating the configuration of a tracking error detecting apparatus according to a first embodiment of the present invention.
Figure 4:
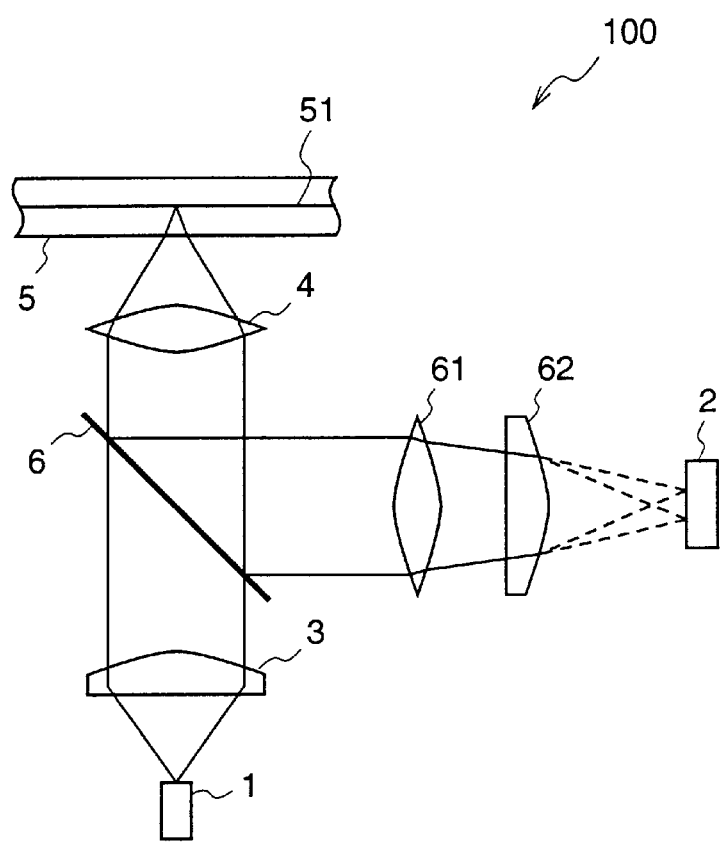
FIG. 4 is a schematic diagram illustrating a main configuration of an optical pickup part 100 in a conventional optical disk reproducing apparatus.
Figure 6A:
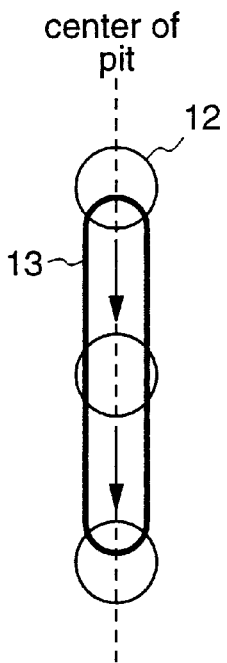
FIGS. 6(a)–(c) are other diagrams exemplifying changes of an intensity distribution pattern of the reflected light quantity when an optical spot passes traversing on a pit.
Figure 6B:
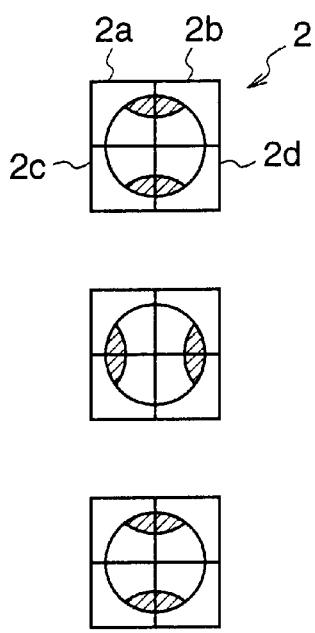
Figure 6C:
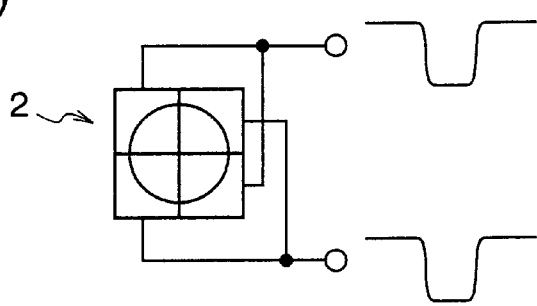
Figure 7A:
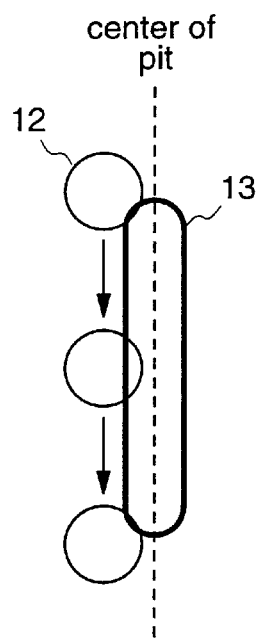
FIG. 7 is another diagram exemplifying changes of an intensity distribution pattern of the reflected light quantity when an optical spot passes traversing on a pit.
Figure 7B:
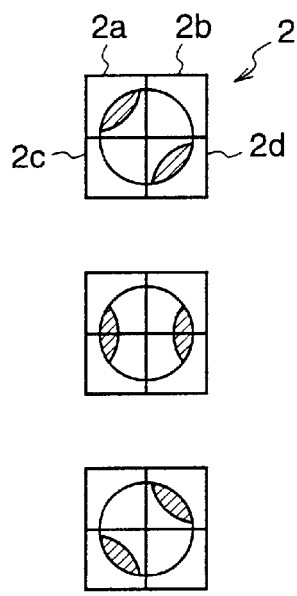
Figure 7C:
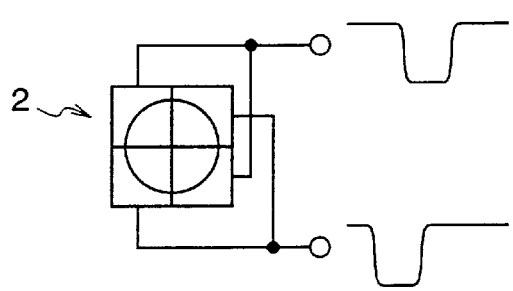
Figure 8:
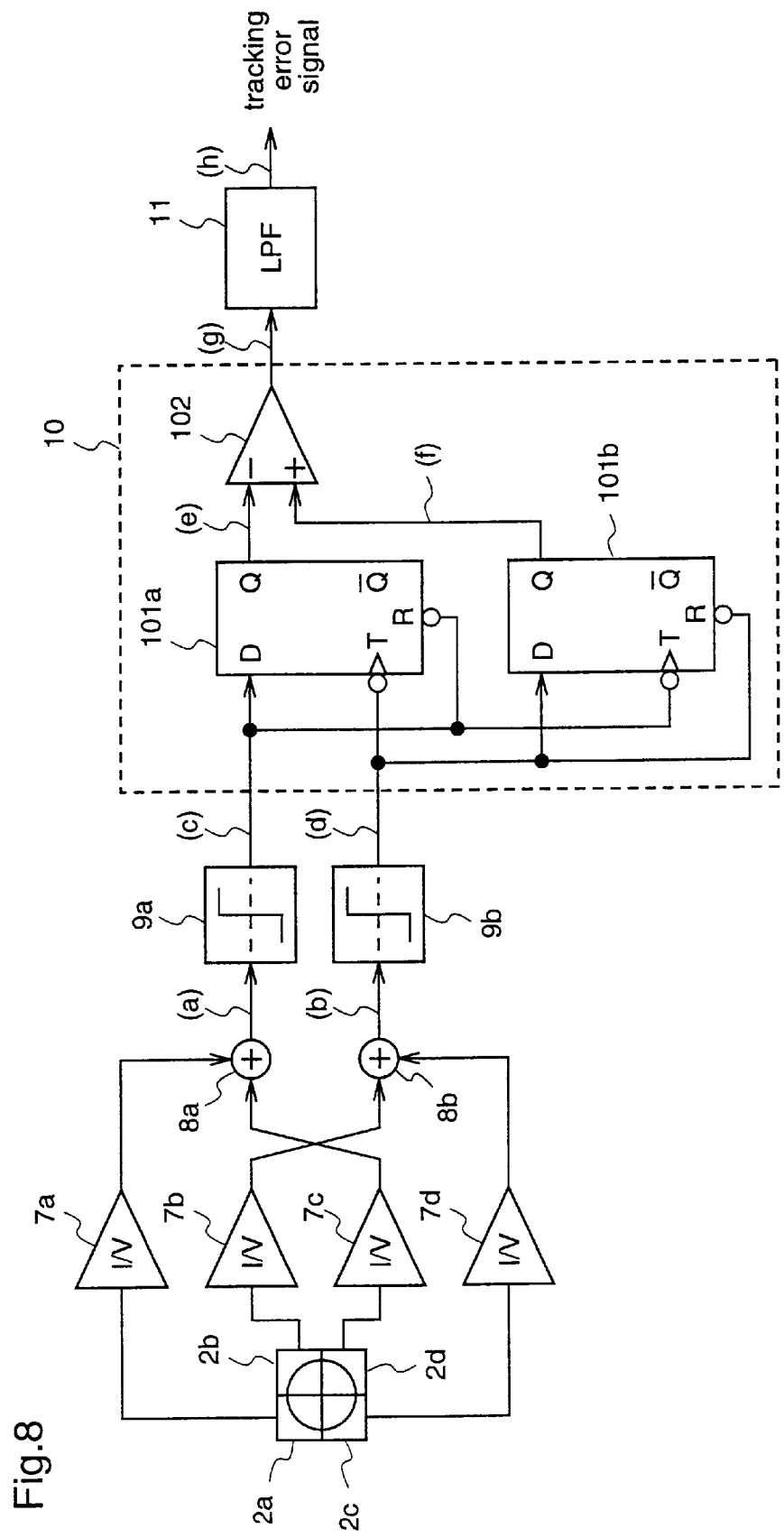
FIG. 8 is a block diagram illustrating the configuration of a conventional tracking error detecting apparatus.
Figure 9A:
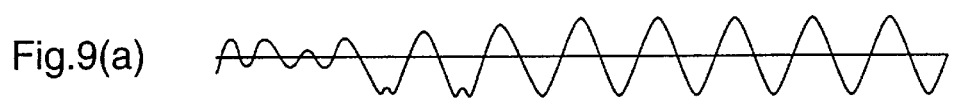
FIGS. 9(a)–(h) are diagrams illustrating waveforms of signals denoted by (a)–(h) in FIG. 8.
Figure 9B:
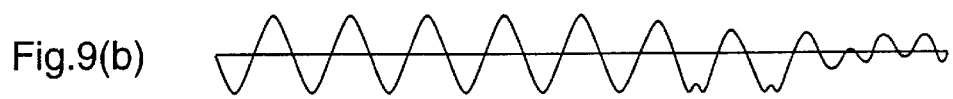
Figure 9C:
Figure 9D:
Figure 9E:
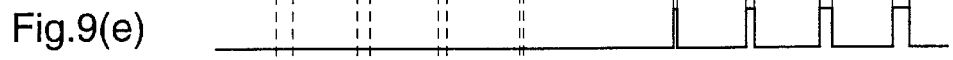
Figure 9F:
Figure 9G:
Figure 9H:
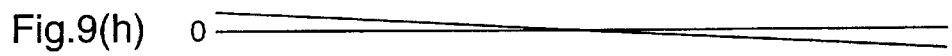

Hereinafter, a tracking error detecting apparatus according to a first embodiment will be described with reference to FIGS. 1 and 2(a)–(c). An example of an optical pickup part of an optical disk reproducing apparatus which is provided with the tracking error detecting apparatus according to the first embodiment is the optical pickup part described in FIG. 4 as a conventional FIG. 1 is a block diagram illustrating the configuration of a tracking error detecting apparatus 1 according to the first embodiment. The same configurations as those shown in FIG. 8 are denoted by the same reference numerals, and their detailed descriptions will be omitted here.

The tracking error detecting apparatus 1 comprises a photo detector 2 which has photo acceptance units 2a–2d that accept a reflected light of an optical spot, and outputs photoelectric current according to the photo acceptance quantity of the photo acceptance units, first to fourth current/voltage conversion circuits 7a–7d which convert the photoelectric current output of the photo detector 2 into voltage signals, signal generators, i.e., first and second adders 8a and 8b which generate two signal series, the phases of which change from each other, from the voltage signal obtained at the first to fourth current/voltage conversion circuits 7a–7d according to a tracking error of the optical spot, first and second analog-digital converters (ADC) 16a and 16b which obtain first and second digital signal series from the two signal series, first and second interpolation filters 17a and 17b which perform an interpolation processing toward the first and second digital signal series respectively, first and second zero cross point detector circuits 18a and 18b which respectively detect zero cross points of the first and second digital signal series interpolated by the first and second interpolation filters 17a and 17b, a phase difference detector circuit 19 which detects a phase difference between the zero cross point of the first digital signal series and the zero cross point of the second digital signal series, and a low-pass filter (LPF) 11 which performs a band restriction toward a phase difference signal to obtain a tracking error signal.

The photo detector 2 is provided with the photo acceptance units 2a, 2b, 2c, and 2d, which are divided into four parts in the shape of a square with a cross inside, for example, as the photo acceptance units and receives a reflected light of the optical spot which is obtained by radiating light on a track of an optical recording medium (not shown) and outputs photoelectric current according to The first to fourth current/voltage conversion circuits 7a, 7b, 7c, and 7d convert the photoelectric current as an output of the photo detector 2 into voltage signals for respective photo acceptance units 2a, 2b, 2c, and 2d.

The first adder 8a adds outputs of the first and third current/voltage conversion circuits 7a and 7c, and the second adder 8b adds outputs of the second and fourth current/voltage conversion circuits 7b and 7d.

The first and second ADCs 16a and 16b subject discretization (sampling) to the signal series outputted from the first and second adders 8a and 8b, respectively, to obtain the first and second digital signal series.

The interpolation filters 17a and 17b obtain interpolation data between sampling data of the digital signal series obtained by the first and second ADCs 16a and 16b, and as a method of interpolation, Nyquist interpolation, for example, is conceivable.

The zero cross point detector circuits 18a and 18b detect zero cross points at rise or fall of the two interpolated data series. As a method for detecting a zero cross point, one which obtains a change point of a code of the interpolated data series (+→−, or −→+), for example, is conceivable.

Figure 2:
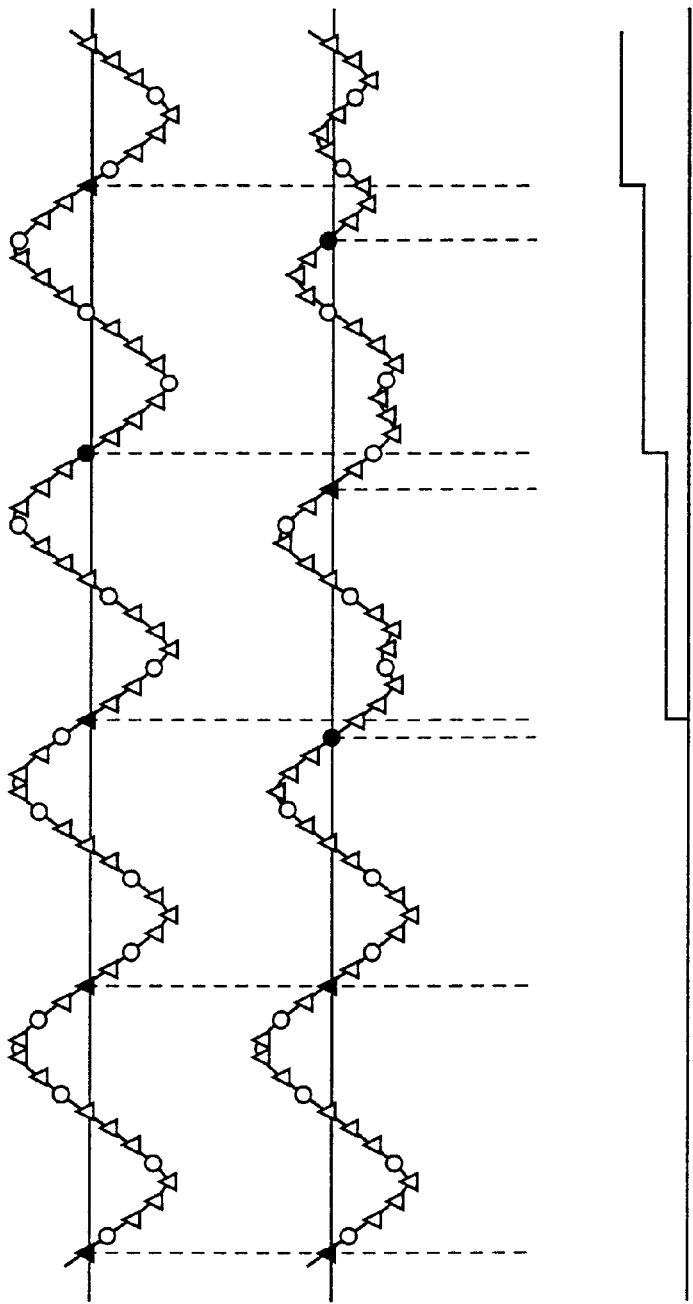
FIGS. 2(a)–(c) are explanation diagrams for explaining the operation of the tracking error detecting apparatus according to the first embodiment of the invention.

Next, the operation of the phase difference detector circuit 19 will be described with reference to FIGS. 2(a)–(c). FIG. 2(a) shows an example of the first signal series outputted from the first zero cross point detector circuit 18a, FIG. 2(b) shows an example of the second signal series outputted from the second zero cross point detector circuit 18b, and FIG. 2(c) shows a phase difference signal obtained by the phase difference detector circuit 19. A description will be given of symbols used in the data series (a) and (b) FIG. 2. A mark of ○ indicates the sampling data obtained by the first or second ADC 16a or 16b, a mark of Δ indicates the interpolation data series obtained by the first or second interpolation filter 17a or 17b, and marks of ● and ▲ indicate zero cross points obtained from the sampling data series and the interpolation data series. Further, the phase difference signal described in FIG. 2(c) is one when paying notice to a neighborhood of a specific track, and which is obtained at a fall of the two data series, the phase difference between which is to be obtained. Further, the number of the interpolation data is n=3.

The phase difference detector circuit 19 detect a phase difference signal from the distance of the zero cross points in respective waveforms of the first and second signal series. When comparing the zero cross points of the first signal series (a) and the second signal series (b), it proves that the amount of the phase difference obtained is proportional to the distance of the zero cross points of the two signal series (a) and (b). Further, a direction of phase lag is obtained by judging at which points zero crossing is performed first between the zero cross points of the two signal series (a) and (b). From the amount of phase difference and a direction of the phase lag detected as described above, the phase difference signal shown in (c) can be obtained.

Figure 10:
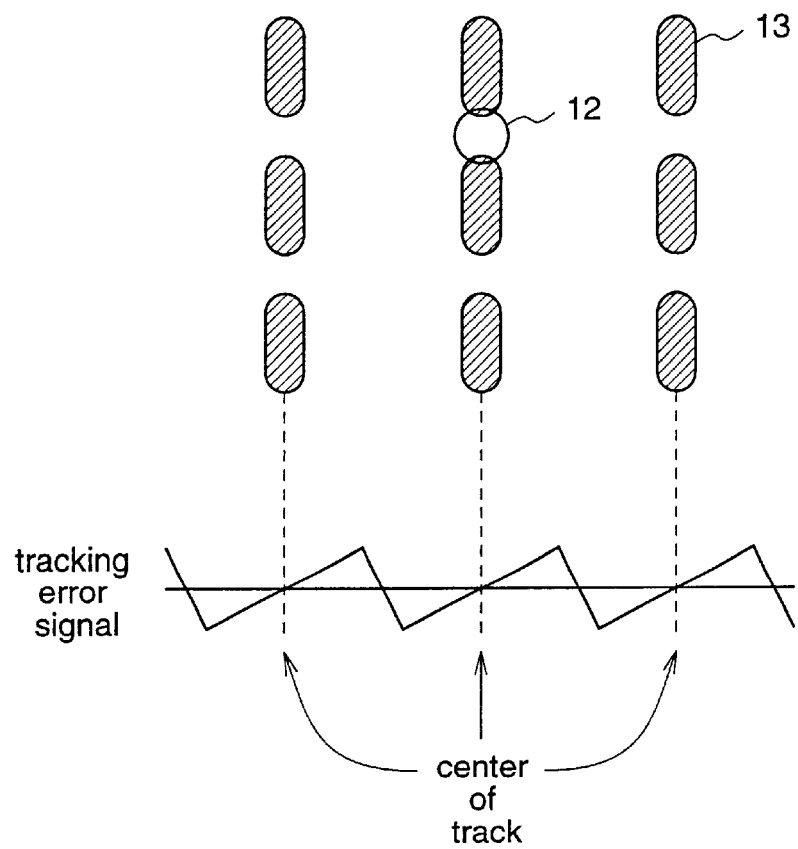
FIG. 10 is a diagram illustrating a waveform seen when a tracking error signal is observed for plural tracks.
Figure 11A:
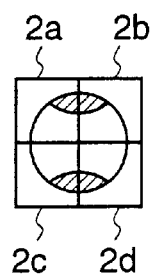
FIGS. 11(a)–(c) are diagrams illustrating a principle of offset generation in a case where the depth of a pit 13 is $\lambda/4$.
Figure 11B:
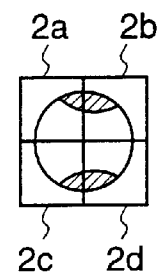
Figure 11C:
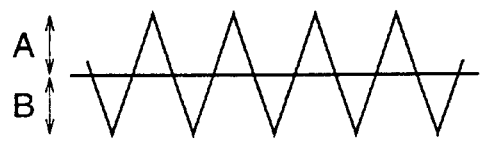
Figure 12A:
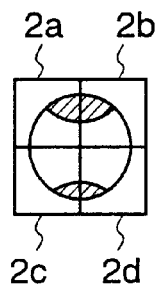
FIGS. 12(a)–(c) are diagrams illustrating a principle of offset generation in a case where the depth of the pit 13 is other than $\lambda/4$.
Figure 12B:
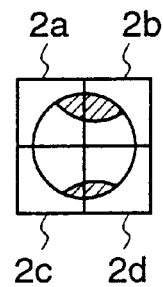
Figure 12C:
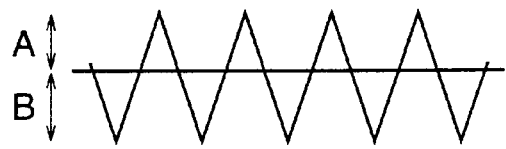
Figure 13:
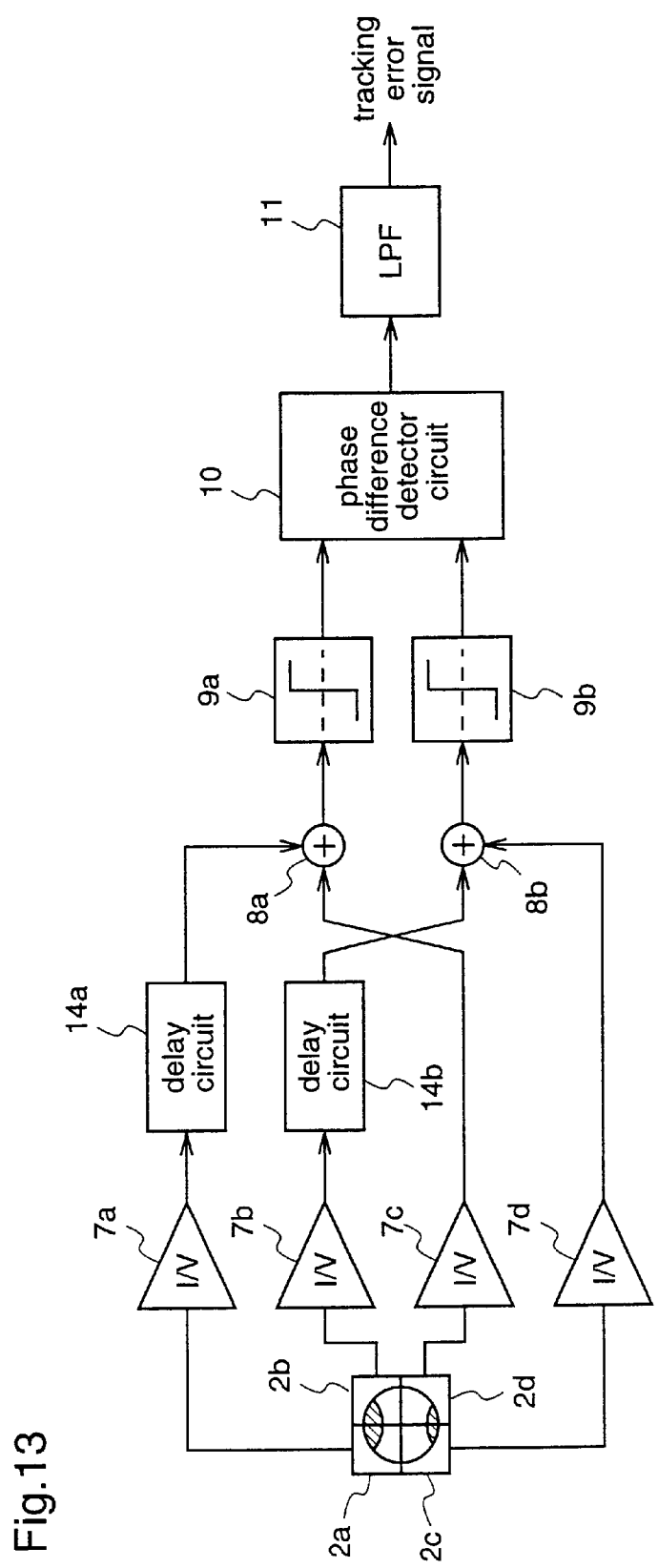
FIG. 13 is a block diagram illustrating the configuration of another conventional tracking error detecting apparatus.
Figure 14:
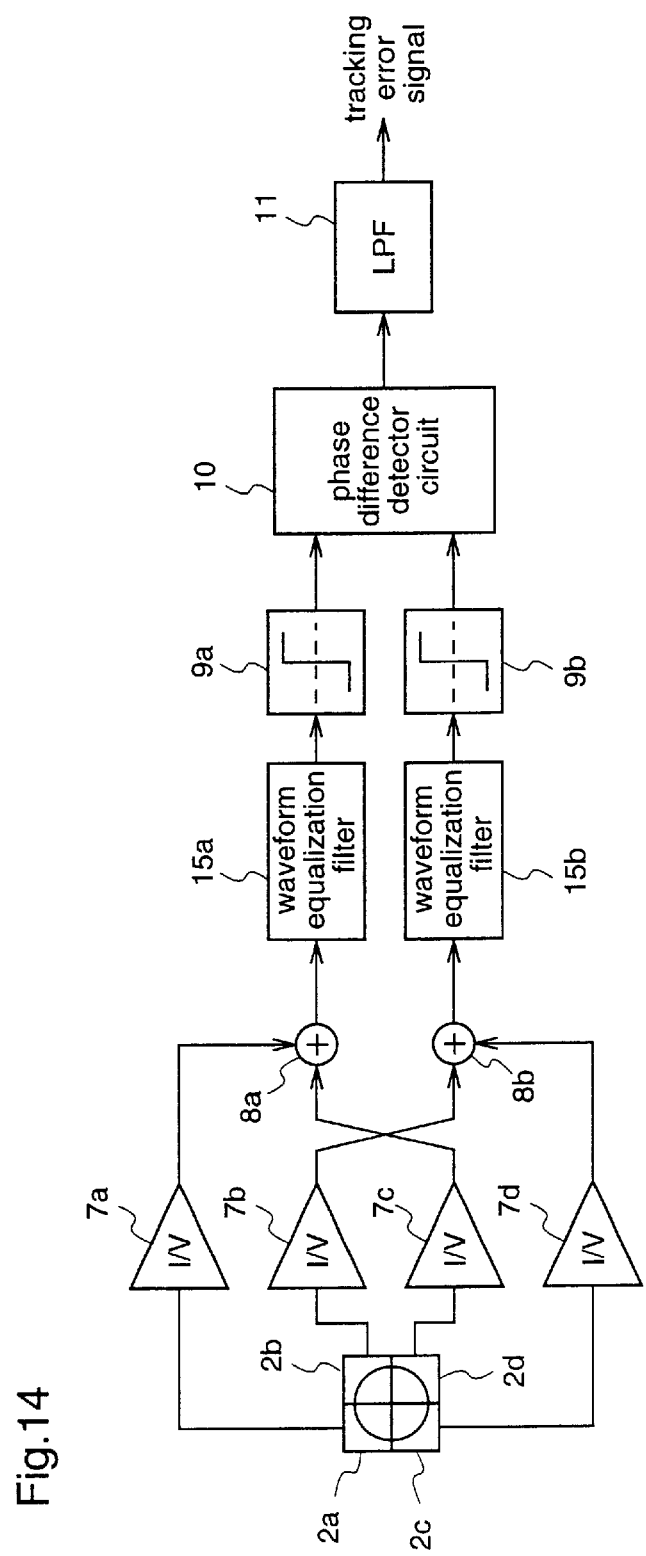
FIG. 14 is a block diagram illustrating the configuration of another conventional tracking error detecting apparatus.

The so-obtained phase difference signal is a nearly linear signal, when paying notice to a neighborhood of a specific track. When observing the phase difference signal for plural tracks, a nearly serrate waveform repeated for each track can be obtained as a whole as described in FIG. 10.

The phase difference signal detected at the phase difference detector circuit 19 is finally subjected to a band restriction by the LPF 11 to obtain a tracking error signal having a band required for a tracking servo control.

Further, a factor setting circuit (not shown) which can set factors of the interpolation filters 17a and 17b may be provided. In this case, when a new factor in which a filter factor having characteristics of high frequency emphasis is folded in a filter factor for interpolation is set as the factor of the interpolation filters 17a and 17b, "interpolation to obtain a tracking error signal" and "filtering to compensate for an attenuation of a high frequency component accompanying high density" can be performed at the same time with one filter, thereby considerably reducing the circuit scale.

As described above, the tracking error detecting apparatus 1 according to the first embodiment can detect a tracking error by a digital signal processing, whereby it is possible to cope with speed doubling of an optical recording/reproducing apparatus and density enhancing of an optical recording medium, which a conventional tracking error detection by an analog signal processing cannot cope with.

Further, since the processing after the first and second ADCs 16a and 16b is a digital signal processing, the configuration after the first and second ADCs 16a and 16b can be united with digital signal processing parts around the tracking error detecting apparatus 1 easily. In addition, the configuration involving an analog signal processing can be considerably reduced, thereby realizing an optical recording/reproducing apparatus being downsized and low in cost.

Embodiment 2

Figure 3:
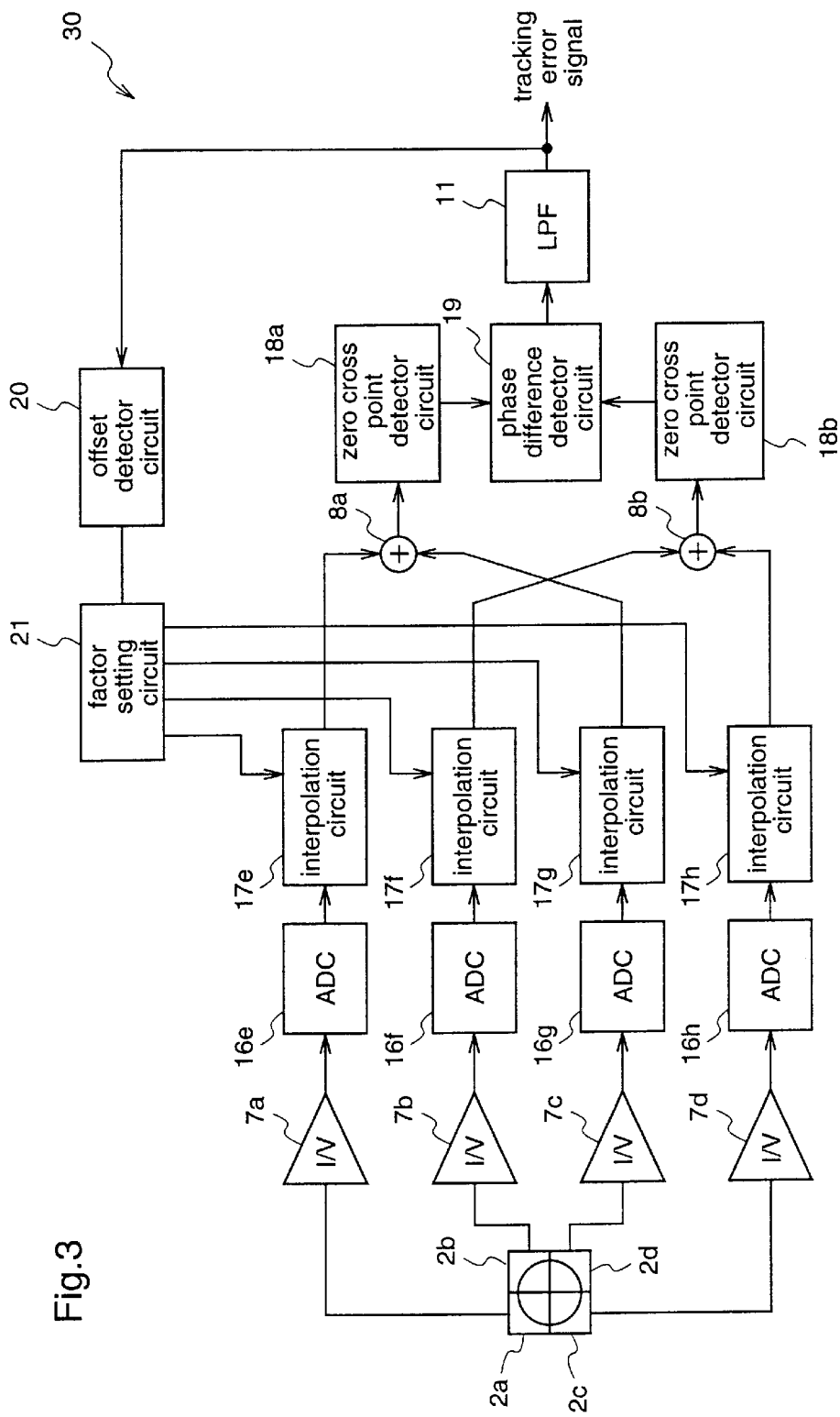
FIG. 3 is a block diagram illustrating the configuration of a tracking error detecting apparatus according to a second embodiment of the present invention.

Next, a second embodiment will be described with reference to FIG. 3. FIG. 3 is a block diagram illustrating the configuration of a tracking error detecting apparatus 30 according to the second embodiment. The same configurations as those shown in FIG. 1 are denoted by the same reference numerals, and their detailed descriptions will be omitted.

A tracking error detecting apparatus according to a second embodiment converts photoelectric current obtained at the photo detector 2 into voltage, digitalizes it, and performs an interpolation processing toward it, thereby to generate two signal series, the phases of which change according to a tracking error. Further, according to an offset detected from a tracking error signal as an output of the LPS 11, the position of data interpolated by the interpolation filters can be controlled.

The tracking error detecting apparatus 30 comprises a photo detector 2 which has photo acceptance units 2a, 2b, 2c, and 2d, and obtains a photoelectric current output, first to fourth current/voltage conversion circuits 7a, 7b, 7c, and 7d which convert the photoelectric current into voltage signals for respective photo acceptance units 2a, 2b, 2c, and 2d, first to fourth ADCs 16e, 16f, 16g, and 16h which subject discretization (sampling) to the signals obtained by the first to fourth current/voltage conversion circuits 7a, 7b, 7c, and 7d, so as to convert the signals into digital signals, first to fourth interpolation filters 17e, 17f, 17g, and 17h which obtain interpolation data among sampling data in four discretized signal series, first and second adders 8a and 8b as signal generators which generate two signals, i.e., first and second digital signal series for performing phase comparison from the four interpolated data series, first and second zero cross point detector circuits 18a and 18b which respectively detect zero cross points of two signals obtained by the first and second adders 8a and 8b, a phase difference detector circuit 19 which detects a phase difference signal from the signals outputted from the first and second zero cross point detector circuits 18a and 18b, a low-pass filter (LPF) 11 which obtains a tracking error signal, an offset detector circuit 20 which detects an offset in the tracking error signal from an output signal of the LPF 11, and a factor setting circuit 21 which set factors of the interpolation filters 17e, 17f, 17g, and 17h according to the detected offset.

As a method of offset detection performed at the offset detector circuit 20, one which performs detection by comparing peak values of + side and side in the tracking error signal, for example, is conceivable. The offset detected by the offset detector circuit 20 is inputted to the factor setting circuit 21. According to the detected offset, the factor setting circuit 21 adjusts factors of the first and second interpolation filters 17e and 17f and factors of the third and fourth interpolation filters 17g and 17h, and deviates data position to interpolate, so as to cancel the offset in the tracking error signal.

For example, in a case where the betweenness of sampling data of T rate is the number of interpolation data n=3 so as to perform interpolation, and a factor to obtain interpolation data at intervals of T/4 is set, when the factor which is made by adding offset to the first and second interpolation filters 17e and 17f at intervals of T/4 (this offset is Δ (delta)) is set, the interpolation data series which is delayed or advanced for the time of the offset Δ can be obtained.

As described above, the offset can be canceled only by changing the factors of the interpolation filters 17e, 17f, 17g, and 17h, whereby it is possible to cope with speed doubling of an optical recording/reproducing apparatus.

Further, in a case where factors of the interpolation filters 17e, 17f, 17g, and 17h are set at the factor setting circuit 21, by setting a new factor which is obtained by folding a filter factor having characteristics of high frequency emphasis in a filter factor to perform interpolation, "interpolation to obtain a tracking error signal", "delay to cancel an offset", and "filtering to compensate for an attenuation of high frequency component accompanying high density" can be performed at the same time with one filter, thereby considerably reducing the circuit scale, resulting in an optical recording/reproducing apparatus provided with a small size and at low cost. Further, while as the photo detector 2, the one which has the four units 2a, 2b, 2c, and 2d, respective twos being arranged vertically and horizontally, is employed in the first and second embodiments for simplifying descriptions, a photo detector is not restricted to the above-described example. In a case where as a photo detector, one which has a different configuration from that of the above-mentioned example is employed, while the configuration after the current/voltage conversion circuit is modified according to the configuration of the photo detector, the configuration after being modified and a method of modification can be realized easily by those skilled in the art. Therefore, it goes without saying that a tracking error detecting apparatus modified according to a photo detector should be included in the scope of the present invention.

APPLICABILITY IN INDUSTRY

As described above, the tracking error detecting apparatus according to the present invention can considerably reduce the circuit scale, can realize an optical recording/reproducing apparatus which reproduces an optical recording medium as typified by a CD or a DVD in a small size and at low cost, and particularly, cope with speed doubling of an optical recording/reproducing apparatus and deisity enhancing of an optical recording medium.

What is claimed is:

1. A tracking error detecting apparatus for detecting a tracking error of an optical spot obtained by radiating light on an optical recording medium, said tracking error detecting apparatus comprising:

a photo detector for receiving reflected light of the optical spot and outputting photoelectric current according to a photo acceptance quantity;

a plurality of current/voltage conversion circuits for converting the photoelectric current of the photo detector into voltage signals;

a plurality of signal generators for generating two signal series, phases of the two signal series changing with respect to each other according to a tracking error of the optical spot, from the voltage signals;

a plurality of analog-digital converters for discretizing the two signal series to obtain first and second digital signal series;

a plurality of interpolation filters for performing interpolation processing of the first and second digital signal series, respectively;

a plurality of zero cross point detector circuits for respectively detecting zero cross points of the first and second digital signal series interpolated by the interpolation filters;

a phase difference detector circuit for detecting a phase difference between the zero cross point of the first digital signal series and the zero cross point of the second digital signal series; and a low-pass filter for performing band restriction toward the detected phase difference to obtain a tracking error signal.

2. A tracking error detecting apparatus for detecting a tracking error of an optical spot obtained by radiating light on an optical recording medium said tracking error detecting apparatus comprising:

a photo detector for receiving reflected light of the optical spot and outputting photoelectric current according to a photo acceptance quantity;

a plurality of current/voltage conversion circuits for converting the photoelectric current of the photo detector into voltage signals;

a plurality of analog-digital converters for discretizing the voltage signals for conversion into digital signals;

a plurality of interpolation filters for performing interpolation processing toward the digital signals;

a plurality of signal generators for generating first and second digital signal series, phases of the first and second digital signal series changing with respect to each other according to a tracking error of the optical spot, from signals obtained at the interpolation filters;

a plurality of zero cross point detector circuits for detecting zero cross points of the first and second digital signal series, respectively;

a phase difference detector circuit for comparing phases of the zero cross point of the first digital signal series and the zero cross point of the second digital signal series, so as to detect a phase difference; and a low-pass filter for performing band restriction toward the detected phase difference.

3. The tracking error detecting apparatus as defined in claim 1, wherein the photo detector has a plurality of photo acceptance units, respective pairs of the photo acceptance units being arranged vertically and horizontally, and the signal generators are each provided with an adder which respectively adds signals obtained from the photo acceptance units in a diagonal direction among the signals obtained from the photo acceptance units, so as to obtain the two signal series.

4. The tracking error detecting apparatus as defined in claim 1, further comprising:

a factor setting circuit for setting a factor of the interpolation filters to a desired value.

5. The tracking error detecting apparatus as defined in claim 4, further comprising:

an offset detector circuit for detecting an offset in the tracking error signal outputted from the low-pass filter, wherein the factor setting circuit sets the factor according to the detected offset so that data in place are interpolated by the interpolation filters.

6. The tracking error detecting apparatus as defined in claim 4, wherein the factor set by the factor setting circuit is one in which a factor to perform interpolation and a factor to compensate for an attenuation of a high frequency component are folded.

7. The tracking error detecting apparatus as defined in claim 2, wherein the photo detector has a plurality of photo acceptance units, respective pairs of the photo acceptance units being arranged vertically and horizontally, and the signal generators are each provided with an adder which respectively adds signals obtained from the photo acceptance units in a diagonal direction among the signals obtained from the photo acceptance units, so as to obtain the first and second signal series.

8. The tracking error detecting apparatus as defined in claim 7, further comprising:

a factor setting circuit for setting a factor of the interpolation filters to a desired value.

9. The tracking error detecting apparatus as defined in claim 8, further comprising:

an offset detector circuit for detecting an offset in the tracking error signal outputted from the low-pass filter, wherein the factor setting circuit sets the factor according to the detected offset so that data in place are interpolated by the interpolation filters.

10. The tracking error detecting apparatus as defined in claim 9, wherein the factor set by the factor setting circuit is one in which a factor to perform interpolation and a factor to compensate for an attenuation of a high frequency component are folded.

11. The tracking error detecting apparatus as defined in claim 8, wherein the factor set by the factor setting circuit is one in which a factor to perform interpolation and a factor to compensate for an attenuation of a high frequency component are folded.

12. The tracking error detecting apparatus as defined in claim 2, further comprising:

a factor setting circuit for setting a factor of the interpolation filters to a desired value.

13. The tracking error detecting apparatus as defined in claim 12, further comprising:

an offset detector circuit for detecting an offset in the tracking error signal outputted from the low-pass filters, wherein the factor setting circuit sets the factor according to the detected offset so that data in place are interpolated by the interpolation filters.

14. The tracking error detecting apparatus as defined in claim 13, wherein the factor set by the factor setting circuit is one in which a factor to perform interpolation and a factor to compensate for an attenuation of a high frequency component are folded.

15. The tracking error detecting apparatus as defined in claim 12, wherein the factor set by the factor setting circuit is one in which a factor to perform interpolation and a factor to compensate for an attenuation of a high frequency component are folded.

16. The tracking error detecting apparatus as defined in claim 5, wherein the factor set by the factor setting circuit is one in which a factor to perform interpolation and a factor to compensate for an attenuation of a high frequency component are folded.

17. The tracking error detecting apparatus as defined in claim 3, further comprising:

a factor setting circuit for setting a factor of the interpolation filters to a desired value.

18. The tracking error detecting apparatus as defined in claim 17, further comprising:

an offset detector circuit for detecting an offset in the tracking error signal outputted from the low-pass filter, wherein the factor setting circuit sets the factor according to the detected offset so that data in place are interpolated by the interpolation filters.

19. The tracking error detecting apparatus as defined in claim 18, wherein the factor set by the factor setting circuit is one in which a factor to perform interpolation and a factor to compensate an attenuation of high frequency component are folded.

20. The tracking error detecting apparatus as defined in claim 17, wherein the factor set by the factor setting circuit is one in which a factor to perform interpolation and a factor to compensate an attenuation of high frequency component are folded.

* * * * *